United States Patent [19]
Vandiest et al.

[11] Patent Number: 5,721,054
[45] Date of Patent: Feb. 24, 1998

[54] GLAZING PANEL AND PROCESS FOR FORMING THE SAME

[75] Inventors: Karel Vandiest, Sint-Pieters-Leeuw; Robert Terneu, Thiméon; Michel Hannotiau, Piétrain; Philippe Legrand, Soignies, all of Belgium

[73] Assignee: Glaverbel, Brussels, Belgium

[21] Appl. No.: 502,470

[22] Filed: Jul. 14, 1995

Related U.S. Application Data

[63] Continuation-in-part of Ser. No. 427,232, Apr. 24, 1995, abandoned.

[30] Foreign Application Priority Data

Apr. 27, 1994 [GB] United Kingdom ............... 94 08 359

[51] Int. Cl.$^6$ ........................................ B32B 17/06
[52] U.S. Cl. ..................... 428/428; 428/426; 428/432; 428/446; 65/60.2; 65/60.5
[58] Field of Search ...................... 65/60.2, 60.5; 428/428, 432, 446, 426; 427/419.2, 419.3, 419.4, 419.7

[56] References Cited

U.S. PATENT DOCUMENTS

| | | | |
|---|---|---|---|
| 3,410,710 | 11/1968 | Mochel | 427/160 |
| 3,411,934 | 11/1968 | Englehart et al. | 427/168 |
| 3,660,061 | 5/1972 | Donley et al. | 65/32.4 |
| 3,978,272 | 8/1976 | Donley | 428/434 |
| 4,123,244 | 10/1978 | Leclercq et al. | 65/60.1 |
| 5,387,433 | 2/1995 | Balian et al. | 427/126.3 |

FOREIGN PATENT DOCUMENTS

| | | |
|---|---|---|
| 1117383 | 2/1982 | Canada. |
| 0573325 | 12/1993 | European Pat. Off.. |
| 1061467 | 4/1954 | France. |
| 2026454 | 2/1980 | United Kingdom. |
| 2097288 | 11/1982 | United Kingdom. |
| 2234264 | 1/1991 | United Kingdom. |
| 2247691 | 3/1992 | United Kingdom. |
| 2248243 | 4/1992 | United Kingdom. |

*Primary Examiner*—Donald E. Czaja
*Assistant Examiner*—Sean Vincent
*Attorney, Agent, or Firm*—Spencer & Frank

[57] ABSTRACT

A glazing panel produced by pyrolytic coating of a substrate is described. One absorbent coating layer comprises at least one metal oxide selected from the oxides of chromium, cobalt and iron. A non-absorbent coating layer, in contact with absorbent layer comprises a material having a refractive index $n(\lambda)$ within the range 1.4 to 3.0. The glazing panel exhibits a color purity of greater than 16%, as measured by reflection from the coated side; and a solar factor of less than 70%.

18 Claims, No Drawings

GLAZING PANEL AND PROCESS FOR FORMING THE SAME

CROSS-REFERENCE TO RELATED APPLICATIONS

This is a Continuation-In-Part application of Serial No. 08/427,232, filed Apr. 24, 1995 now abandoned in which priority is claimed from Application No. 94 08 359.9 filed Apr. 27, 1994 in the United Kingdom, the entire specifications of which are incorporated herein by reference.

BACKGROUND OF THE INVENTION

1. Field of the invention

The present invention relates to a glazing panel, in particular to a glazing panel comprising a coated substrate.

Reflective transparent solar control glazing panels have become a useful material for architects to use for the exterior facade of buildings. Such panels have aesthetic qualities in reflecting the immediate environment and being available in a number of colours, in providing a design opportunity. Such panels also have technical advantages by providing the occupants of a building with protection against solar radiation by reflection and/or absorption and eliminating the dazzling effects of intense sunshine, giving an effective screen against glare, enhancing visual comfort and reducing eye fatigue.

From a technical point of view, it is desired that the glazing panel shall not pass too great a proportion of total incident solar radiation in order that the interior of the building shall not become overheated in sunny weather. The transmission of total incident solar radiation may be expressed in terms of the "solar factor". As used herein, the expression "solar factor" means the sum of the total energy directly transmitted and the energy which is absorbed and re-radiated on the side away from the energy source, as a proportion of the total radiant energy incident on the coated glass.

From an aesthetic point of view, it is preferred to provide glazing panels with a blue or gold colour in reflection. Where buildings have a relatively large glazed area and also where high buildings are concerned, a blue reflected colour provides a less obtrusive appearance to the observer. Buildings having a gold glazed area are perceived as being indicative of richness and quality.

It is also preferred to improve the purity of the colour of the glazing panels when seen in reflection, in particular so that the whole glazed facade of a building presents a uniform appearance when viewed from the exterior. Purity of colour has been found to be particularly difficult to achieve simultaneously with a low solar factor, especially where the coatings are deposited by pyrolysis. Pyrolysis generally has the advantage of producing a hard coating, which precludes the need for a protective layer. The coatings formed by pyrolysis have durable abrasive- and corrosion-resistant properties. It is believed that this is due in particular to the fact the process involves depositing of coating material onto a substrate which is hot. Pyrolysis is also generally cheaper than alternative coating processes such as sputtering, particularly in terms of the investment in plant.

2. Description of the Related Art

There exist glazing panels having a coating providing protection against solar radiation.

For example it is known to deposit onto glass a coloured metal oxide film, such as a mixture of iron, chromium and cobalt oxides, by pyrolysis. Such glazed panels typically are amber in reflection from the coated side, with a dominant wavelength of from 571 to 575 nm, and have a low purity of colour of about 6 to 8%.

According to Canadian patent CA 1117383 (PPG Industries Inc.) the abrasion resistance of such coatings may be improved by a second coating layer of stannic oxide with a thickness of from 30 to 80 nm. Coating is carried at a temperature of from 500° C. to 710° C. According to this patent, the colour of the first coating is unchanged by the second coating.

SUMMARY OF THE INVENTION

It is an object of this invention to provide an aesthetically pleasing glazing panel capable of being produced by pyrolytic coating of a substrate, with a low solar factor and a high purity of reflected colour, which panel can be made industrially on a large scale by pyrolysis.

According to the invention, there is provided a glazing pane comprising a substrate and coated thereon by pyrolysis:

(A) one absorbent coating layer comprising at least one metal oxide selected from the oxides of chromium, cobalt and iron; and (B) a non-absorbent coating layer, in contact with layer (A) comprising a material having a refractive index $n(\lambda)$ within the range 1.4 to 3.0, said glazing panel exhibiting the following characteristics:

(i) a colour purity of greater than 16%, as measured by reflection from the coated side; and (ii) a solar factor of less than 70%.

The substrate is preferably in the form of a ribbon of vitreous material, such as glass or some other transparent rigid material. In view of the proportion of incident solar radiation which is absorbed by the glazing panel, especially in environments where the panel is exposed to strong or long-term solar radiation, there is a heating effect on the glass panel which may require that the glass substrate be subsequently subjected to a toughening process. However, the durability of the coating enables the glazing panel to be mounted with the coated face outermost, thus reducing the heating effect. Furthermore, the selectivity of the glazing panels according to the invention limits the energy absorption of the panel at a given luminous transmission, which attenuates the need to toughen the glass.

Preferably, the substrate is clear glass, although the invention also extends to the use of coloured glass as the substrate.

The various layers of the coated glazing panel act together in a beneficial way to achieve the object of the invention. The precise properties obtained can be varied by the choice of the materials constituting each coating layer and the thickness thereof.

Preferably, the composition of the absorbent coating layer is from 12% to 14% by weight $Cr_2O_3$, and from 23% to 28% by weight $Fe_2O_3$, the balance being $Co_3O_4$. The combination of chromium, cobalt and iron oxides has the particular advantage that it provides a coating layer having good absorbence properties and durability.

Generally, the absorbent layer is of such a composition and such a thickness that $$\frac{T_L}{1 - R_L} << 1.0$$

where $T_L$ represents the visible light transmission factor and $R_L$ represents the visible reflectivity.

The geometrical thickness of the absorbent coating layer is preferably from 40 to 75 nm.

Preferably the thickness of the non-absorbent layer (B) is sufficient to change the dominant wavelength of the glazing panel when viewed by reflection from the coated side. We particularly prefer that the optical thickness of this coating layer, that is the geometric thickness multiplied by the refractive index of this coating layer, is from 69 nm to 300 nm. The thickness of the non-absorbent layer (B) should be optimised to ensure the desired properties. Thus we have found for example that when the non-absorbent layer is formed of SnO$_2$, a blue aspect is formed when the optical coating thickness is between 120 and 150 nm. A gold aspect is achieved however when TiO$_2$ is the coating material at an optical thickness of about 100 nm. In general, a gold aspect results from an optical thickness of at least 80 nm, while a deep blue aspect results from an optical thickness of at least 110 nm.

The geometric thickness of the non-absorbent layer is preferably from 35 to 90 nm.

The non-absorbent coating layer comprises a material having a refractive index n($\lambda$) of 1.4 to 3.0, over the whole of the visible spectrum (380 nm to 780 nm). By the term "non-absorbent material" used herein we mean materials which have a "refractive index" n($\lambda$) which is greater than, preferably substantially greater than the value of the "spectral absorption index" k($\lambda$) over the whole of the visible spectrum (380 to 780 nm). In particular, we have found advantage in choosing a material for which the refractive index n($\lambda$) is greater than 10 times the spectral absorption index k($\lambda$) over the whole wavelength range 380 to 780 nm. Most preferably, the material of the non-absorbent coating layer is selected from aluminium nitride, aluminium oxide, bismuth oxide, silicon nitride, stannic oxide, titanium oxide (both rutile and anatase), zinc oxide, zirconium oxide and silicon oxide.

It should be noted that, in the metal oxide or nitride non-absorbent material coating layer, it is not essential for the metal and the oxygen or nitrogen to be present in stoichiometric proportions.

Generally, the non-absorbent layer is of such a material and such a thickness that $$\frac{T_L}{1-R_L} \cong 1.0.$$

Definitions of refractive index and spectral absorption index can be found in International Lighting Vocabulary, published by the International Commission on Illumination (CIE), 1987, pages 127, 138 and 139.

The following table lists the refractive index n($\lambda$) and the spectral absorption index k($\lambda$) of a number of suitable and unsuitable non-absorbent materials over the range 380 nm to 780 nm.

TABLE 1

| Material | n($\lambda$ = 380–780 nm) | k($\lambda$ = 380–780 nm) |
|---|---|---|
| TiO$_2$<sup>r</sup> | 2.9–2.3 | 0* |
| Bi$_2$O$_3$ | 2.92–2.48 | 0.1–0* |
| TiO$_2$<sup>a</sup> | 2.64–2.31 | 0* |
| # Fe$_2$O$_3$/ Cr$_2$O$_3$/ Co$_3$O$_4$ | 2.44–2.8 | 0.63–0.1 |
| ZnO | 2.3–2.02 | 0.08–0.001 |
| Si$_3$N$_4$ | 2.08–2.01 | 0* |
| SnO$_2$ | 1.94–1.85 | 0* |
| Al$_2$O$_3$ | 1.79–1.76 | 0* |
| SiO$_2$ | 1.47–1.45 | 0* |

TABLE 1-continued

| Material | n($\lambda$ = 380–780 nm) | k($\lambda$ = 380–780 nm) |
|---|---|---|
| AlN | ≅2.0 | 0* |
| ZrO$_2$ | ≅2.1 | 0* |
| SiO$_x$ | 1.7 | 0* |

Note:
<sup>r</sup>rutile form
<sup>a</sup>anatase form
0* means less than 10$^{-3}$
# means that the material is unsuitable for use as the non-absorbent coating layer. This is an absorbent material.

It is particularly preferred that the material of the non-absorbent coating layer is titanium oxide and/or stannic oxide. If the non-absorbent coating layer is an outer layer, stannic oxide is beneficial if a higher resistance to abrasion is required, such as where the panel is positioned with the coated face outermost.

Usually, no other coating layers will be present. Thus, in a preferred embodiment of the invention, the absorbent coating layer is coated directly on the substrate (i.e. the first coating layer) and the non-absorbent coating layer is an exposed coating layer (i.e. the second coating layer). In other embodiments, the position of the absorbent and non-absorbent coating layers is reversed. A third coating layer may be applied to the substrate, over the second coating layer, if desired. For example, where the third coating layer has a composition and thickness similar to that of the first layer, a glazed panel is obtained which has similar optical properties when viewed from both sides thereof.

It is desirable that the panel shall transmit a reasonable proportion of visible light in order to allow natural illumination of the interior of the building and in order to allow its occupants to see out. The transmission of visible light may be expressed in terms of the "transmission factor" as a proportion of the incident light falling on the coated substrate. Preferably, the light transmission factor of the panel according to the invention is between 30% and 65%.

Preferably, the panel has a mean ultra violet transmission, over the ultra violet spectrum (280 nm to 380 nm), of less than or equal to 30%, most preferably less than or equal to 15%, which can be beneficial in reducing damage to light sensitive materials inside the building.

For aesthetic reasons we prefer that the dominant wavelength in reflection from the coated side is between 470 and 490 nm (blue) or between 575 and 596 nm (gold). The reflectivity of visible light from this side is preferably from 3% to 33%.

Additionally, the purity of the reflected colour is greater than 16%, preferably greater than 50%. The purity of a colour is defined according to a linear scale where a defined white light source has a purity of zero and the pure colour has a purity of 100%. By the term "colour purity" as used herein, we mean excitation purity measured with illuminant C as defined in International Lighting Vocabulary, published by the International Commission on Illumination (CIE), 1987, pages 87 and 89. The "colour purity" is measured from the coated side of the panel. When the panel is used for example in buildings, the coated side of the panel may face the exterior, this arrangement being made possible by the use of pyrolysis to form the coating layers. With the solar panels according to the prior art it has not been possible, for the same manufacturing methods and costs, to obtain purities of reflected colour as high as can be obtained with the panels according to the present invention.

The glazing panels according to the invention have a solar factor of less than 70%, preferably less than 60% when the panels according to the invention are positioned with the coated side facing the exterior, i.e. facing the energy source. Generally, this positioning leads to a improved solar factor compared with the positioning of the panel with the coated side away from the energy source.

The panels according to the invention may be installed in single or multi-glazed assemblies. The panels according to the invention may usefully be employed in laminated glass structures.

The invention also provides a process for forming a glazing panel comprising the sequential coating by pyrolysis of a substrate with:

(A) one absorbent coating layer comprising at least one metal oxide selected from the oxides of chromium, cobalt and iron; and (B) a non-absorbent coating layer, in contact with layer (A) comprising a material having a refractive index $n(\lambda)$ within the range 1.4 to 3.0, said glazing panel exhibiting the following characteristics:

(i) a colour purity of greater than 16%, as measured by reflection from the coated side; and (ii) a solar factor of less than 70%.

Each pyrolyric coating step may be carried out at a temperature of from 550° C. to 750° C.

The coatings can be formed on a sheet of glass which moves in a tunnel oven or on a glass ribbon during formation, whilst it is still hot. The coatings can be formed inside the lehr which follows the glass ribbon forming device or inside the float tank on the top face of the glass ribbon whilst the latter is floating on a bath of molten tin.

The coating layers A and B are preferably applied to the substrate by chemical vapour deposition. Chemical vapour deposition is particularly preferred because it tends to lead to coatings of regular thickness and composition, uniformity of the product being particularly important where the glazing panels are to be used over large areas. With the use of liquids as the reactant materials, it is difficult to control the vaporisation process, and it is difficult to obtain a good uniformity of coating thickness. Moreover, the pyrolysis is essentially limited to the manufacture of oxide coatings, such as $SnO_2$ and $TiO_2$. It is difficult to make multilayer coatings because every coating deposition produces a significant cooling of the substrate. Furthermore, chemical vapour deposition is more economic in terms of raw materials, leading to lower wastage.

To form each coating, the substrate is brought into contact, in a coating chamber, with a gaseous medium comprising one or more substances in the gaseous phase. The coating chamber is fed with a reagent gas through one or more nozzles, the length of which is at least equal to the width to be coated. Depending on the type of coating to be formed and the reactivity of the substances used, if several substances have to be used, these are distributed either in the form of a mixture by a single ejection nozzle in the coating chamber, or separately by several ejection nozzles.

Methods and devices for forming such a coating are described for example in French patent No 2 348 166 (BFG Glassgroup) or in French patent application No 2 648 453 A1 (Glaverbel). These methods and devices lead to the formation of particularly strong coatings with advantageous optical properties.

To form coatings of tin oxide $SnO_2$ or titanium dioxide $TiO_2$, two successive nozzles are used. The reagent carrying the metal (Sn or Ti), fed in at the first nozzle, is a tetrachloride, liquid at ambient temperature, vaporised in a current of anhydrous carrier gas at an elevated temperature. Vaporisation is facilitated by the atomisation of these reagents in the carrier gas. To produce the oxide, the molecules of tetrachloride are brought into the presence of water vapour conducted to the second nozzle. The water vapour is superheated and is also injected into a carrier gas. $SnO_2$ may be formed for example using the proportions of $SnCl_4$ and $H_2O$ given in British patent specification GB 2026454 (Glaverbel).

Coatings of silicon oxide $SiO_2$ or $SiO_x$ may be deposited from silane $SiH_4$ and oxygen in accordance with the descriptions in British patent specifications GB 2234264 and GB 2247691.

DESCRIPTION OF THE PREFERRED EMBODIMENTS

The invention will now be described in more detail, with reference to the following non-limiting examples.

EXAMPLE 1

A substrate consisting of a 4 mm thick sheet of clear soda-lime glass was coated by pyrolysis in the following manner. An apparatus comprising two successive nozzles is used. A reagent comprising a mixture of the acetylacetonates of chromium, cobalt and iron, vaporised in a current of anhydrous nitrogen gas at about 600° C., is fed in at the first nozzle. Vaporisation is facilitated by the atomisation of these reagents in the carrier gas. Water vapour is conducted to the second nozzle. The water vapour is superheated to about 600° C., and is also injected into a carrier gas, which is air heated to about 600° C. The flow rate of gas (carrier gas+reagent) in each nozzle is 1 m³/cm width of substrate/hr, at the operating temperature.

The coating process was continued until the geometric thickness of the coating formed on the substrate was 68 nm. The first coating was analysed and found to have the following composition (% by weight):

| | |
|---|---|
| $Fe_2O_3$ | 26 |
| $Co_3O_4$ | 61 |
| $Cr_2O_3$ | 13 |

The substrate was then subjected to a second coating. A reagent consisting of stannic chloride, vaporised in a current of anhydrous nitrogen gas at about 600° C., is fed in at the first nozzle. Water vapour is conducted to the second nozzle. The water vapour is superheated to about 600° C., and is also injected into a carrier gas, which is air heated to about 600° C. The flow rate of gas (carrier gas+reagent) in each nozzle is 1 m³/cm width of substrate/hr, at the operating temperature.

The second coating process was continued until the geometric thickness of the tin oxide coating formed on the substrate, superimposed on the absorbent coating layer, was 66 nm.

The glazing panel described above had an intense blue colour on reflection from the coated side. Various properties of the panel were measured and found to be as follows:

| | |
|---|---|
| Dominant wavelength by reflection | 475 nm |
| Colour purity | 62% |
| Solar factor ($F_s$) | 53% |
| UV transmission | 15% |

EXAMPLES 2 & 3

Using similar processes to that described in Example 1, coated glazing panels were prepared having the following characteristics.

| Example No: | 2 | 3 |
| --- | --- | --- |
| First coating material | $TiO_2$* | $TiO_2$* |
| First coating thickness (nm) | 41.0 | 85.0 |
| Second coating material | FCC[1] | FCC[1] |
| Second coating thickness (nm) | 46.5 | 45.0 |
| Colour (reflected) | gold | blue |
| Dominant wavelength (nm) | 578 | 484 |
| Colour purity (%) | 28.0 | 20.1 |
| Solar factor (%) | 49.0 | 50.8 |
| UV transmission (%) | 23.0 | 25.8 |

Notes:
*Titanium dioxide in anatase form is obtained from pyrolysis of $TiCl_4 + H_2O$ at above 600° C.;
[1] A mixture of $Fe_2O_3$, $Co_3O_4$, and $Cr_2O_3$ as used in Example 1

What is claimed is:

1. A glazing panel, comprising:
   a vitreous substrate and, coated on the substrate by pyrolysis in any order,
   an absorbent coating layer (A) comprising at least one metal oxide selected from the group consisting essentially of oxides of chromium, cobalt and iron; and
   a non-absorbent coating layer (B) in contact with the absorbent coating layer (A) and comprising a non-absorbent material having a refractive index n(λ) ranging from 1.4 to 3.0,
   wherein the glazing panel has a coated side and exhibits
   (i) a color purity of greater than 16%, as measured by reflection from the coated side; and
   (ii) a solar factor of less than 70%, and
   wherein the glazing panel has a dominant wavelength when viewed from the coated side, and wherein the non-absorbent coating layer (B) has a thickness which is sufficient to change the dominant wavelength of the glazing panel when viewed by reflection from the coated side.

2. The glazing panel according to claim 1, wherein the absorbent coating layer (A) has a composition comprised of:
   from 12% to 14% by weight of $Cr_2O_3$;
   from 23% to 28% by weight of $Fe_2O_3$; and
   the balance $Co_3O_4$.

3. The glazing panel according to claim 1, wherein the nonabsorbent material is a material having a refractive index n(λ) which is greater than spectral absorption index k(λ) thereof over the whole of the visible spectrum ranging from 380 to 780 nm.

4. The glazing panel according to claim 3, wherein the non-absorbent material of the non-absorbent coating layer (B) is at least one material selected from the group consisting essentially of aluminum nitride, aluminum oxide, bismuth oxide, silicon nitride, stannic oxide, titanium oxide, zinc oxide, zirconium oxide and silicon oxide.

5. The glazing panel according to claim 1, wherein the substrate is clear glass.

6. The glazing panel according to claim 1, wherein the absorbent coating layer (A) is coated directly on the substrate and the non-absorbent coating layer (B) is an exposed coating layer.

7. The glazing panel according to claim 1, wherein the glazing panel has a light transmission factor which ranges between 30% and 65%.

8. The glazing panel according to claim 1, wherein the glazing panel has a mean ultra violet transmission, over a range of from 280 nm to 380 nm, of less than or equal to 30%.

9. The glazing panel according to claim 8, wherein the glazing panel has a mean ultra violet transmission, over the range 280 nm to 380 nm, of less than or equal to 15%.

10. The glazing panel according to claim 1, wherein the absorbent coating layer (A) has a geometric thickness which ranges from 40 to 75 nm.

11. The glazing panel according to claim 1, wherein the non-absorbent coating layer (B) has an optical thickness which ranges from 69 to 300 nm.

12. The glazing panel according to claim 1, wherein the non-absorbent coating layer (B) has a geometric thickness which ranges from 35 to 90 nm.

13. The glazing panel according to claim 1, wherein the glazing panel has a color purity, as measured by reflection from the coated side, which is greater than 50%.

14. The glazing panel according to claim 1, wherein the glazing panel has a dominant wavelength when viewed from the coated side, and wherein the dominant wavelength viewed by reflection from the coated side ranges between 470 and 490 nm.

15. The glazing panel according to claim 1, wherein the glazing panel has a dominant wavelength when viewed from the coated side, and wherein the dominant wavelength viewed by reflection from the coated side ranges between 575 and 596 nm.

16. A process for forming a glazing panel, comprising:
   a. sequentially pyrolytically coating a vitreous substrate with, in any order:
      an absorbent coating layer (A) comprising at least one metal oxide selected from the group consisting essentially of oxides of chromium, cobalt and iron; and
      a non-absorbent coating layer (B), in contact with the absorbent coating layer (A) and comprising a material having a refractive index n(λ) which ranges from 1.4 to 3.0,
   wherein the glazing panel has a coated side and exhibits
   (i) a color purity of greater than 16%, as measured by reflection from the coated side; and
   (ii) a solar factor of less than 70%, and
   wherein the glazing panel has a dominant wavelength when viewed from the coated side, and wherein the non-absorbent coating layer (B) has a thickness which is sufficient to change the dominant wavelength of the glazing panel when viewed by reflection from the coated side.

17. The process according to claim 16, wherein sequential pyrolytic coating is carried out at a temperature ranging from 550° C. to 750° C.

18. The process according to claim 16, wherein sequential pyrolytic coating to form absorbent coating layer (A) and non-absorbent coating layer (B) is by chemical vapor deposition.

* * * * *